United States Patent
Graube et al.

(10) Patent No.: US 9,245,160 B2
(45) Date of Patent: Jan. 26, 2016

(54) METHOD FOR SETTING UP A BEACON NETWORK INSIDE A RETAIL ENVIRONMENT

(71) Applicant: Qualcomm Technologies International, Ltd., Cambridge (GB)

(72) Inventors: Nicolas Graube, Barrington (GB); Murray Jarvis, Stapleford (GB); Ben Tarlow, Cottenham (GB); Simon Gibbs, Bury St. Edmunds (GB)

(73) Assignee: Qualcomm Technologies International, Ltd., Cambridge (GB)

( * ) Notice: Subject to any disclaimer, the term of this patent is extended or adjusted under 35 U.S.C. 154(b) by 156 days.

(21) Appl. No.: 13/970,706

(22) Filed: Aug. 20, 2013

(65) Prior Publication Data

US 2015/0054620 A1    Feb. 26, 2015

(51) Int. Cl.
*H04Q 5/22* (2006.01)
*G06K 7/10* (2006.01)
*G08B 13/14* (2006.01)
*G06K 17/00* (2006.01)

(52) U.S. Cl.
CPC ........ *G06K 7/10366* (2013.01); *G06K 7/10009* (2013.01); *G06K 7/10316* (2013.01); *G06K 17/00* (2013.01); *G06K 2017/0051* (2013.01); *G08B 13/1427* (2013.01)

(58) Field of Classification Search
CPC .......... G06K 7/10366; G06K 19/0723; G06K 7/0008; G06K 7/10009; G06K 7/10297; G06K 7/10386
See application file for complete search history.

(56) References Cited

U.S. PATENT DOCUMENTS

| | | | | |
|---|---|---|---|---|
| 5,774,876 A * | 6/1998 | Woolley | ............... | G01S 5/0289 235/385 |
| 5,942,987 A * | 8/1999 | Heinrich | ............. | G06K 7/0008 340/10.42 |
| 6,025,780 A * | 2/2000 | Bowers | ............. | G06K 19/0701 340/10.51 |
| 6,084,512 A * | 7/2000 | Elberty | ................ | G06F 21/316 340/10.31 |
| 6,330,971 B1 * | 12/2001 | Mabry | ................ | G03F 7/70541 235/376 |
| 6,415,978 B1 * | 7/2002 | McAllister | .......... | G06K 7/0004 235/462.01 |
| 7,124,943 B2 * | 10/2006 | Quan | ....................... | G06F 8/65 235/451 |

(Continued)

FOREIGN PATENT DOCUMENTS

EP    0696011 A2    2/1996

OTHER PUBLICATIONS

GB Search Report issued in related GB Application No. 1406127.9, dated Oct. 3, 2014.

*Primary Examiner* — Jennifer Mehmood
*Assistant Examiner* — Rufus Point
(74) *Attorney, Agent, or Firm* — Mahamedi Paradice LLP (57) ABSTRACT

A system having multiple short-range transmission devices, each of which is assigned a unique identity and is positioned at a respectively different location within a three dimensional space. The assignment of the identity is according to signals broadcast by short-range device(s) as sensed unambiguously by a listening device or devices proximate to the short-range transmission device(s) and further associating the identity with a reference point.

20 Claims, 9 Drawing Sheets

(56) References Cited

U.S. PATENT DOCUMENTS

| | | | | |
|---|---|---|---|---|
| 7,207,488 | B2* | 4/2007 | Hammerslag | G06K 7/0004 235/440 |
| 7,295,114 | B1* | 11/2007 | Drzaic | A62B 99/00 235/385 |
| 7,423,534 | B2* | 9/2008 | Dhanjal | G06Q 10/08 340/539.26 |
| 7,728,729 | B2* | 6/2010 | Christopher | G06Q 10/08 235/385 |
| 7,844,505 | B1* | 11/2010 | Arneson | G06Q 10/087 340/10.2 |
| 8,120,482 | B2* | 2/2012 | Ulrich | G06K 17/0022 235/384 |
| 8,159,350 | B2* | 4/2012 | Bauchot | G06K 7/0008 340/10.1 |
| 8,174,383 | B1* | 5/2012 | Chung | G06Q 10/08 340/539.1 |
| 8,446,254 | B2* | 5/2013 | Carrick | G01S 5/14 340/10.1 |
| 8,917,165 | B2* | 12/2014 | Marques | G06Q 10/00 340/10.1 |
| 2001/0045893 | A1* | 11/2001 | Swartzel | G06Q 10/08 340/572.1 |
| 2002/0008621 | A1* | 1/2002 | Barritz | G01S 5/00 340/572.1 |
| 2002/0149480 | A1* | 10/2002 | Shanks | G06K 7/0008 340/572.1 |
| 2002/0180588 | A1* | 12/2002 | Erickson | G06K 17/00 340/10.2 |
| 2002/0185532 | A1* | 12/2002 | Berquist | G07G 1/0045 235/385 |
| 2002/0196126 | A1* | 12/2002 | Eisenberg | G06K 17/00 340/10.2 |
| 2003/0009383 | A1* | 1/2003 | Mori | G06Q 10/08 705/22 |
| 2003/0097302 | A1* | 5/2003 | Overhultz | G06Q 10/02 705/14.68 |
| 2003/0216969 | A1* | 11/2003 | Bauer | G06K 7/0008 705/22 |
| 2005/0040974 | A1* | 2/2005 | Shanks | G06K 7/0008 341/53 |
| 2005/0134459 | A1* | 6/2005 | Glick | G08B 13/1427 340/572.1 |
| 2005/0231370 | A1* | 10/2005 | Tagato | G06Q 10/087 340/572.1 |
| 2006/0012480 | A1* | 1/2006 | Klowak | G01S 13/825 340/572.1 |
| 2006/0022038 | A1 | 2/2006 | Hewlin et al. | |
| 2006/0022823 | A1* | 2/2006 | Ryal | G08B 13/1418 340/572.1 |
| 2006/0092072 | A1* | 5/2006 | Steiner | G01C 3/26 342/46 |
| 2006/0119471 | A1* | 6/2006 | Rudolph | G06Q 10/08 340/10.41 |
| 2006/0119487 | A1* | 6/2006 | Atkinson | G06Q 20/206 340/13.25 |
| 2006/0176152 | A1* | 8/2006 | Wagner | G06K 7/0008 340/10.2 |
| 2006/0197653 | A1* | 9/2006 | Kung | G06K 7/0008 340/10.34 |
| 2006/0210115 | A1* | 9/2006 | Nemet | G05D 1/0263 382/104 |
| 2006/0280181 | A1* | 12/2006 | Brailas | G06K 7/10099 370/392 |
| 2006/0287759 | A1* | 12/2006 | Charych | B66F 9/0755 700/213 |
| 2007/0035380 | A1* | 2/2007 | Overhultz | G06Q 10/087 340/5.9 |
| 2007/0046439 | A1* | 3/2007 | Takaku | G06K 7/0008 340/10.41 |
| 2007/0061041 | A1* | 3/2007 | Zweig | G05D 1/0261 700/245 |
| 2007/0096882 | A1* | 5/2007 | Bandy | G06K 7/0095 340/10.51 |
| 2007/0188342 | A1* | 8/2007 | Valeriano | G06K 17/00 340/8.1 |
| 2007/0198174 | A1* | 8/2007 | Williams | G06Q 10/047 705/1.1 |
| 2007/0257796 | A1* | 11/2007 | Easton | G08B 21/0275 340/572.1 |
| 2007/0282482 | A1* | 12/2007 | Beucher | G06Q 10/08 700/225 |
| 2007/0285236 | A1* | 12/2007 | Batra | G01S 13/74 340/572.1 |
| 2007/0290802 | A1* | 12/2007 | Batra | G06K 7/0008 340/10.1 |
| 2008/0198001 | A1* | 8/2008 | Sarma | G06Q 10/087 340/539.1 |
| 2008/0231431 | A1* | 9/2008 | Stawar | B62B 3/1408 340/425.5 |
| 2008/0278325 | A1* | 11/2008 | Zimman | G06F 21/32 340/572.1 |
| 2008/0284600 | A1* | 11/2008 | Drzaic | A62B 99/00 340/572.1 |
| 2009/0036060 | A1* | 2/2009 | Takahashi | G06K 7/10435 455/67.14 |
| 2009/0121843 | A1* | 5/2009 | Bauchot | G06K 7/0008 340/10.31 |
| 2009/0166415 | A1* | 7/2009 | Braun | G06Q 10/087 235/385 |
| 2009/0289776 | A1* | 11/2009 | Moore | G06K 7/0008 340/10.41 |
| 2009/0322490 | A1* | 12/2009 | Kung | G06K 7/0008 340/10.3 |
| 2010/0019887 | A1* | 1/2010 | Bridgelall | H04Q 9/00 340/10.2 |
| 2010/0138037 | A1* | 6/2010 | Adelberg | G06Q 10/087 700/241 |
| 2010/0277284 | A1* | 11/2010 | Brown | G06K 7/0008 340/10.3 |
| 2011/0012713 | A1* | 1/2011 | Wilkinson | G06K 7/10178 340/10.3 |
| 2011/0128129 | A1* | 6/2011 | Graczyk | G06K 17/0022 340/10.33 |
| 2011/0199211 | A1* | 8/2011 | Campero | G06K 7/0008 340/572.1 |
| 2011/0221576 | A1* | 9/2011 | Itagaki | G06K 7/10217 340/10.4 |
| 2011/0231236 | A1* | 9/2011 | Gonzalez | G06Q 30/02 705/14.25 |
| 2011/0309931 | A1* | 12/2011 | Rose | E21F 17/18 340/539.13 |
| 2012/0075071 | A1* | 3/2012 | Liu | B65D 19/001 340/10.1 |
| 2012/0256732 | A1* | 10/2012 | McAllister | B65C 9/1865 340/10.2 |
| 2014/0304123 | A1* | 10/2014 | Schwartz | G06Q 10/087 705/28 |
| 2014/0344118 | A1* | 11/2014 | Parpia | G06Q 10/087 705/28 |
| 2015/0194030 | A1* | 7/2015 | Davidson | G08B 13/2468 340/572.7 |

\* cited by examiner

METHOD FOR SETTING UP A BEACON NETWORK INSIDE A RETAIL ENVIRONMENT

FIELD OF THE INVENTION

The present invention is directed toward setting up a network of short-range communication devices in three dimensional space and, in particular, to systems and methods associated with assigning identifications to the short-range communication devices and associating the short-range communication devices with products, category of products, product location, based on interactions among a communications device and a plurality of short-range transmission devices.

BACKGROUND OF THE INVENTION

Short-range beacons using technologies such as infrared, ultrasonics, near-field communications (NFC) and Bluetooth® have been used to determine the presence of a device in the transmission range of the beacon. These technologies, may, for example, determine whether one Bluetooth enabled device is detached from another Bluetooth enabled device in order to sound an alarm.

SUMMARY OF THE INVENTION

An example embodiment of the present invention includes a system having multiple short-range transmission devices, each of which is assigned a unique identity by a listening device and is positioned at a respectively different location within a three dimensional space. The assignment of the identity is according to the signals broadcast by short-range device(s) as sensed unambiguously by the listening device and further includes associating the unique identity of the short-range devices, with a product, product category or location of a product in the three dimensional space.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to the scale. Also, the dimensions of the various features are arbitrarily expanded or reduced for clarity. Included in the drawings are the following figures.

DETAILED DESCRIPTION OF THE INVENTION

With the proliferation of sensors and mobile listening devices, it may be possible for users, employing mobile listening devices, to gather information related to products in an indoor area based on the ability of the listening device to unambiguously receive data from one of the transponders located in the indoor area.

To support applications related to providing information from the transponders, the transponders in the indoor area are initialized. Particularly, the transponders, distributed throughout the area, may be assigned unique identity values associated with their respective locations in the indoor physical space to enable proximity applications for the client.

However, current navigation and positioning systems, providing longitude and latitude information, are optimized for outdoor environments and do not function well inside buildings. Furthermore, location determination for an interior space may require dense and expensive infrastructures, for example, WiFi Access Points and/or video cameras. As such, establishing indoor transponders for supporting the above mentioned applications remains a challenge.

Embodiments of the invention overcome the limitations by setting up a group of short-range transmission devices such as RF transponders in a three dimensional space and by assigning the RF transponders unique identifications. A RF transponder may not have a pre-defined identification and may acquire a unique identification during the setup process based on an interaction with the listening mobile device. The unique identification value of a RF transponder may be related to a product, class of products, indoor area identification value or physical location identification value within the indoor area.

The RF transponder identification may, for example be associated to a reference point (of a reference system) representing the physical location within the given environment. The reference point, in turn, may be related to a product. An advantage of this method is that, products may be moved around within the reference system, as the transponder identification will be associated to any product that is placed at the reference point. In this embodiment, it is desirable to keep the reference system current in terms of the association of the RF transponder identification with the reference point (as the physical location of the product may change). Alternatively, the RF transponder may be associated with products that are in the vicinity of the RF transponder's physical placement without using a reference system. The advantage of this method is its simplicity, however, any movement of a product needs to be tracked, and, in turn, the transponders may need to be moved or reprogrammed to reflect association with the moved product (as the products are directly associated with the RF transponder identification and not with the physical location of the product).

The subject invention is described in terms of short-range transmitters (e.g. Bluetooth® low energy (Ble) transmitters) the signals from which are captured by mobile listening devices, such as a mobile telephone including a Bluetooth transceiver. It is contemplated, however, that other types of transmitter and receivers can be used, for example infrared, ultrasonic, or near-field communications (NFC). In addition, as described below, it is contemplated that the transponders may be RF transceivers that do not broadcast signals but, instead, sense signals broadcast by the portable mobile device, such as the listening device. In such a scenario, the transponders may be associated with other transponders in a MESH network (e.g., ZigBee network based on IEEE 802.15) described below. Furthermore, although the transponders are described as being stationary, it is contemplated that they may be mobile devices as well and, thus, that the areas within the indoor area or zones related to these transponders may move throughout the space. Furthermore, although the invention is described in terms of a retail environment, it is contemplated that it has broader application including, without limitation, security, enterprise workflow, gaming and social interactions.

An example beacon system according to the subject invention employs a plurality of transponders each of which may broadcast a signal that is sensed by the listening device or sense a signal that is broadcast by a listening device. Each transponder may be assigned a unique identity. In one implementation, a transponder is assigned a unique identity and is further associated with a reference point. The reference point may be a particular area related to the transponder, for example, an aisle or a shelving unit in a retail store. In another example, a transponder may be further associated with a product in the retail store, or information related to the product.

Yet in another example, the listening device may assign the unique identity to the transponder upon being in a particular area or a zone relative to the transponder. For example, the listening device may be in an area relative to a transponder such that the listening device unambiguously receives data signals from the transponder. In other words, the listening device may be within a threshold proximity level of the transponder, or in a specific zone, and may assign the unique identity to the transponder accordingly. In one example, the listening device may select the transponder from a plurality of transponders that are in the retail area, upon determining that it unambiguously senses the signal of the transponder. The listening device may then further associate the transponder with the particular area or zone. In one example, the collection of RF transponders (e.g. short-range transmitters) taken as a whole or individually, in combination with their broadcast signals captured by a listening device, and signal characteristics that are derived from the broadcast signals, may further help to determine zone proximity in the indoor area. The signal characteristics attributed to an RF transponder can be, but are not limited to, a range of its signal strengths, a range of the times of arrival of a distinguishable sequence, a range of signal qualities, a range of round trip times of an emitted signal and/or a range of phases of the signal. For example, in a retail environment, a zone may be determined probabilistically according to a measured signal strength of a transponder located in an aisle of a retail store. In yet in another example, this zone, in turn, may be defined in terms of an estimated proximity of the listening device to products being sold in that aisle or in a portion of the aisle covered by the transponder.

In a proximity aware system, a plurality of transponders may each broadcast a unique signal that is sensed by a listening device or they may sense a signal broadcast by the listening device. The unique identification signal, in one example, may be a tag ID, a retailer ID, a store ID, or a combination thereof. Each transponder may also be further associated with one or more products or a product type. Transponders may be discrete and unrelated to each other. In another example, transponders can be related to each other based on their respective positions, or zones, relative to each other, or by association with a product or product type. As such, association of a product may be based on multiple transponders.

Figure 1A:
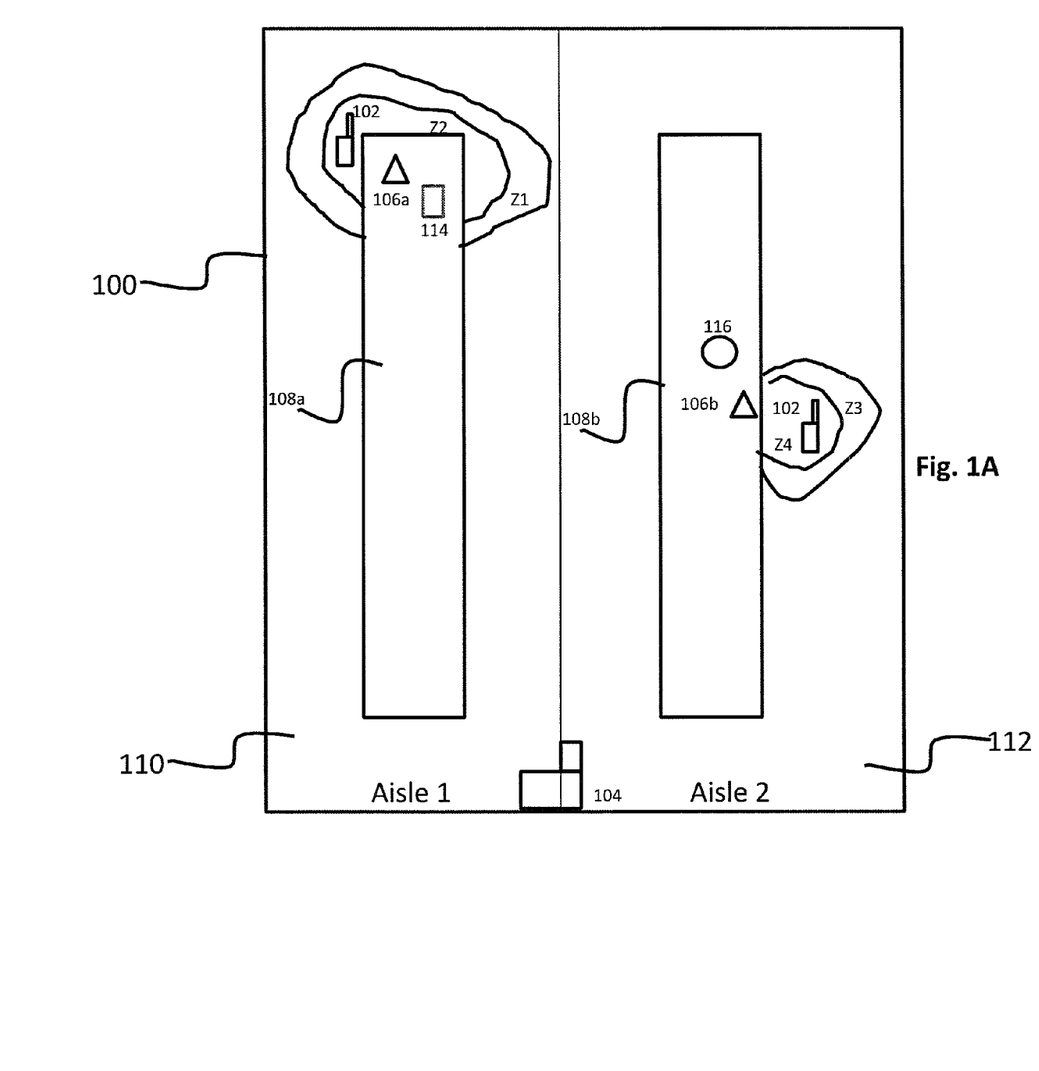
FIG. 1A is a top-view diagram illustrating an embodiment for setting up of unrelated transponders in an indoor environment.

The RF transponder may be associated with a reference point. The reference point in turn may be associated with a product in the indoor space. Transponder may also be associated with information related with the products. FIG. 1A is a top-view drawing of a portion of a self-serve retail venue 100, such as a grocery store, including a shelf units 108a and 108b. Transponders 106a and 106b are coupled to the shelf unit 108a and 108b, respectively, such that their broadcast signals may be sensed by the listening device 102, for example. Transponder 106a may be associated with the aisle 110, or shelf 108a. The aisle may be a reference point in a reference map. Transponder 106a may also be associated with product 114 or information related to product 114. In a similar fashion, transponder 106b may be associated with the, shelf unit 108b and/or the related product 116. In one implementation, transponder 106a and 106b are discrete and may not be related to each other.

It is contemplated that the determination of the product classification may be performed by the listening device. In this embodiment, the listening device may send only the transponder IDs to the server. The server may respond with all product information. The listening device may then analyze the received data and associate the transponder ID with a location based on a planogram (described below), downloaded to the listening device, or associate the transponder ID with a product or a product type.

In a server-centric example, the listening device 102, after entering the retail venue 100, transmits information about the unique ID of the transponder 106a corresponding to the signal characteristics of 106a coupled with a product information or location information of the transponder as a reference to the server 104. The server 104 may process the received information related to the product and determine an association of the product with the transponder and furthermore classify the product into a product group. For example, the product information may include the name of a specific beverage drink. The server 104 may classify the product into a beverage class based on the name of the drink. Moreover, the classification may be based on a planogram, stored in the server 104. A planogram is a layout of a retail venue that provides a diagram or model that indicates the placement of retail products on shelves. In one example, the planogram may have detailed information about products including labels, digital images, videos of the products in the retail venue. In another example, the server may decode a bar code information of the product. Alternatively, or in addition, the server may map a location of the transponder to a respective coordinate point based on a coordinate system, stored in the server 104. Furthermore, in yet another example, management of the product information may be handled by a content management system implemented on the server. Server-centric systems reduce the computational load on the listening device but may increase the communications load in the covered area and, thus, the latency of the product association determination.

In one embodiment of the invention, the transponders 106 may be receiving signals from other devices, for example, they may sense signals broadcast by the listening device 102 or transmitters and send identifying information about the listening device and the transponder. The server may then send a request to the listening device to determine its location or product association and, after receiving the response from the listening device, couple the location or product information to the unique ID of the transponder. Optionally, the transponders may already be associated with products, and in one example, the transponders may then send the product association information and the sensed signal strength measurements to the server 104. As such, the server 104 may determine which products are associated with the transponder 106 upon further determining a threshold proximity level of the listening device relative to the transponder. In such an example, the transponders may be in a MESH network of transponders that may be linked to the server, for example, via a global information network. Example listening device, server and transponder devices are described below with reference to FIGS. 2A, 2B and 2C.

In an exemplary embodiment of the invention, the listening device may assign unique identities to the transponders and further associate each unique ID with a reference related to a product, class of products or a location in the indoor area. In such an example, an administrator of the store may be operating the listening device and may thus be configured to be an administrative listening device.

Figure 6:
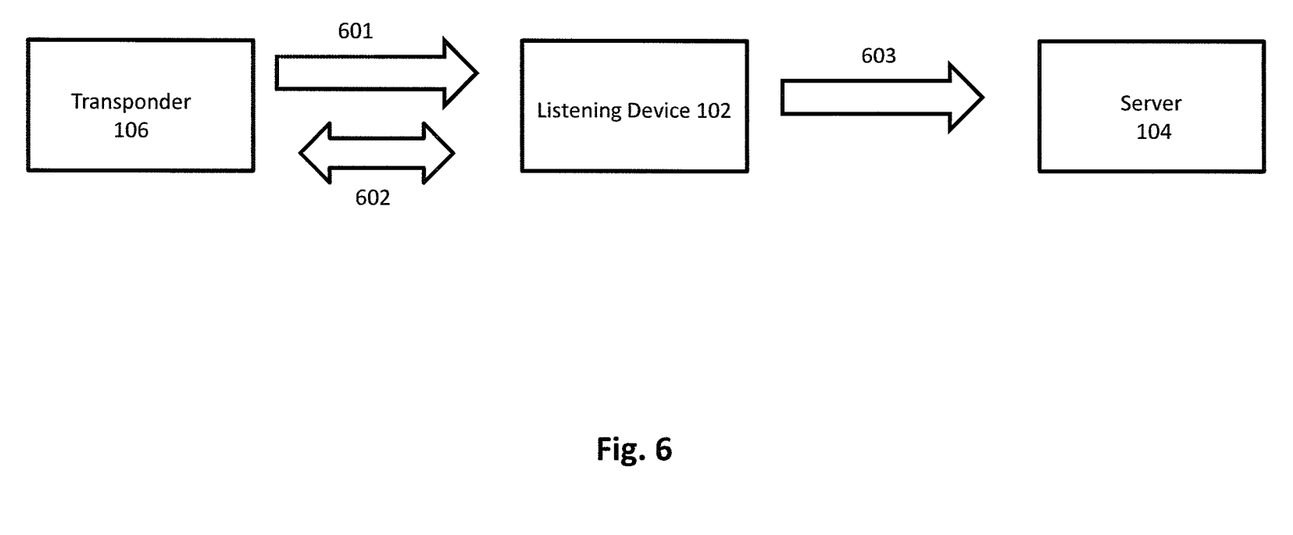
FIG. 6 is a flow-chart of an embodiment describing communication among a listening device, transponder and the server.

FIG. 6 is a functional block diagram that illustrates the assignment of a unique ID to a transponder by an administrative listening device 102. At step 601, transponder 106 broadcasts a signal that is sensed by the administrative listening device 102. The signal may be transmitted periodically and sensed by the administrative listening device that may be nearby the transponder 106. The listening device, in one example, unambiguously senses the broadcasted signal, and decrypts an identification value of the transponder 106. In one example, the administrative listening device 102 may have privileged access to retailer ID or store ID. As such, the listening device may then associate the identification of the transponder 106 with a retailer ID or a store ID, that may be previously stored in the listening device 102. Thus, at step 602, based on the association, the listening device 102 assigns the unique ID to the transponder 102. The listening device may also store the unique ID in the memory of the listening device. The listening device 102 then further associates the unique ID with a reference point related to the transponder (location, product, etc) and transmits this information to the server 104.

Figure 7:
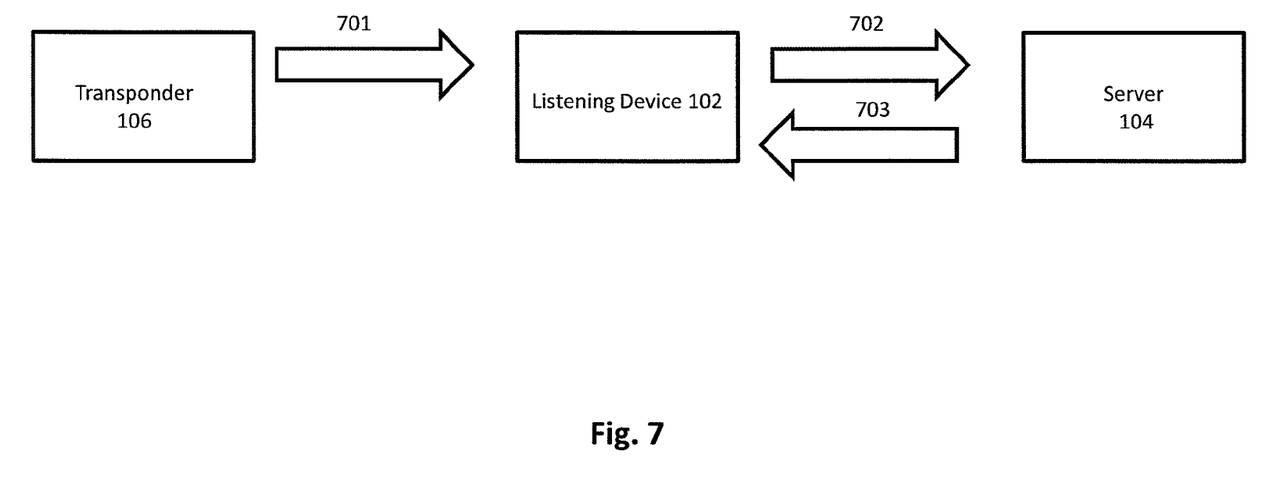
FIG. 7 is a flow-chart of another embodiment describing communication among a listening device, transponder and the server.

The listening device 102, in another example, may be the customer listening device 102. As shown in FIG. 7, the customer listening device 102, for example, may use the transponder ID to receive product information from the server. At step 701, the transponder 104, may broadcast signals including a unique ID of the transponder as assigned by the administrator of the store, during the setup process. The customer listening device 102 senses the unique ID of the transponder. At step 702, the customer listening device 702 then performs a query to the server 104 by sending the unique ID of the transponder. The server 104, upon receiving the transponder ID, processes the ID. In one example, the server may identify product information associated with the transponder unique ID. The product information may be stored in the server 104.

As such, at step 703, in response, the server 104 may send the information to the customer listening device 102.

FIG. 1A is a top-view drawing of a portion of a self-serve retail venue 100, such as a grocery store, including shelf units 108a and 108b. Shelf unit 108a is located in aisle 110 and shelf unit 108b is located in aisle 112. Aisle 110 may be a "beverage aisle", and aisle 112 may be a "produce aisle". Transponders 106a and 106b are coupled to the shelf units 108a and 108b, respectively, such that their broadcast signals may be sensed by the listening device 102, for example. The listening device 102 may further communicate with the server 104 to exchange information related to the transponders, or to the products. The broadcast signals may be radio frequency (RF) or ultrasonic signals or they may be light signals having wavelengths within the infrared (IR), visible or ultra-violet (UV) ranges.

In one example, an administrator, a store employee, carrying listening device 102, may enter the retail venue 100 and place the transponders 106a and 106b in the vicinity of the products 114 and 116, respectively, in order to setup a beacon system (not shown) in the retail venue 100. Beacon system may include multiple transponders, but for the sake of brevity, discussion will be focused with reference to transponder 106a.

Broadcast signals of RF transponder 106a may help to determine zones, for example, zones Z1 and Z2, in the retail venue 100. Moreover, the signal characteristics, that may be derived from the sensed signals and attributed to the RF transponder 106a can be, but are not limited to, a range of its signal strengths, a range of the times of arrival of a distinguishable sequence, a range of signal qualities, a range of round trip times of an emitted signal and/or a range of phases of the signal, may further help to determine the zones In one example, the listening device 102 in the retail venue 100 may be in the proximity of the transponder 106a, such as in the zones Z1, and Z2 (as shown by curved lines), corresponding to the transponder 106a, for example. However, upon entering the zone Z2, the listening device may unambiguously sense signals of the transponder 106a. In one example, zone Z2 may correspond to a threshold proximity level, according to a threshold signal or signal characteristics derived from the broadcast signal of the transponder 106a. The listening device 102 may then securely, or non-securely, communicate with the transponder 106a.

In one example, the listening device 102, upon being within the threshold proximity level of transponder 106a, may perform a configuration step to assign a unique identity to the transponder 106a. The configuration step may include, at first, decoding an encrypted broadcasted signal of the transponder 106a. The decrypted message may include a tag ID value of the transponder 106a. The listening device 102 may then associate a retailer ID value or a store ID value with the tag ID value in order to assign the unique ID to the transponder. In one example, the tag ID may be 48 bits long of which 12 bits are used by the listening device to identify the transponder during an identification phase. As such, the listening device may then fill in the remaining 36 bits with other data, for example, a retail ID value or a store ID value to assign a unique identity to the transponder 106a.

Alternatively, the transponder may be configured with a 48 bits tag identity by the manufacturer. As such, the listening device 102 may simply then decode the tag identity and assign the tag ID as the unique ID.

The listening device 102 may then perform an association of the physical location of the transponder with the unique ID of the transponder by various means. Particularly, the association may be performed once the listening device is within a threshold proximity level of the transponder, or in other words, once the listening device senses the signal of the transponder unambiguously. In one example, the listening device 102 may associate the assigned unique ID of the transponder 106a with a reference point corresponding to the physical location of the transponder 106a. The association may be performed when the listening device is in the zone Z2 (where it senses the signal unambiguously). The reference point may be the aisle number where the transponder 106a is physically located, for example, aisle 110. In another example, the reference point may be the shelf ID of shelf 108a. The reference points may be accessed from an internal reference database stored in the server 104. Alternatively, the internal reference database may be downloaded to listening device 102, and the user of the listening device 102 may access the database directly from the listening device 102. Upon accessing the corresponding reference point of the transponder 106a, the user of the listening device 102 may associate the reference point and the unique ID of the transponder 106a and send the pair to the server 104.

In one example, a product name or description of the product 114 may be used as the reference point.

It is contemplated that, the association process performed by the listening device 102, may take place once the listening device 102 is within the threshold proximity of a given transponder, or in other words, when the listening device unambiguously senses the signal of the given transponder. As such the listening device may then communicate with the transponder. For example, the listening device 102 may not communicate exclusively with transponder 106a when it is in zone Z1. This may be because of the presence of other transponders (not shown), which may interfere with the broadcast signal of the transponder 106a. However, once the listening device 102 moves to zone Z2, it may sense signal of the transponder 106a unambiguously, and thus have a one-to-one communication with the transponder 106a. This may be determined by the listening device 102. Thus, the listening device may then carry the association process.

In another example, the listening device 102 may associate the assigned unique ID of the transponder 106a with the physical location of the transponder 106a using an indoor map of the retail store 100. The indoor map may be stored in the server 104 and the listening device may then download the map from the server 104. In one example, the map may provide topographic information. In another example, the map may be a list of products or sections in the retail venue 100. The user of the listening device 102 may pinpoint the physical location of the transponder 106a in the map and associate the physical location with the unique ID of the transponder 106a and send the associated pair to the server 104.

Figure 2A:
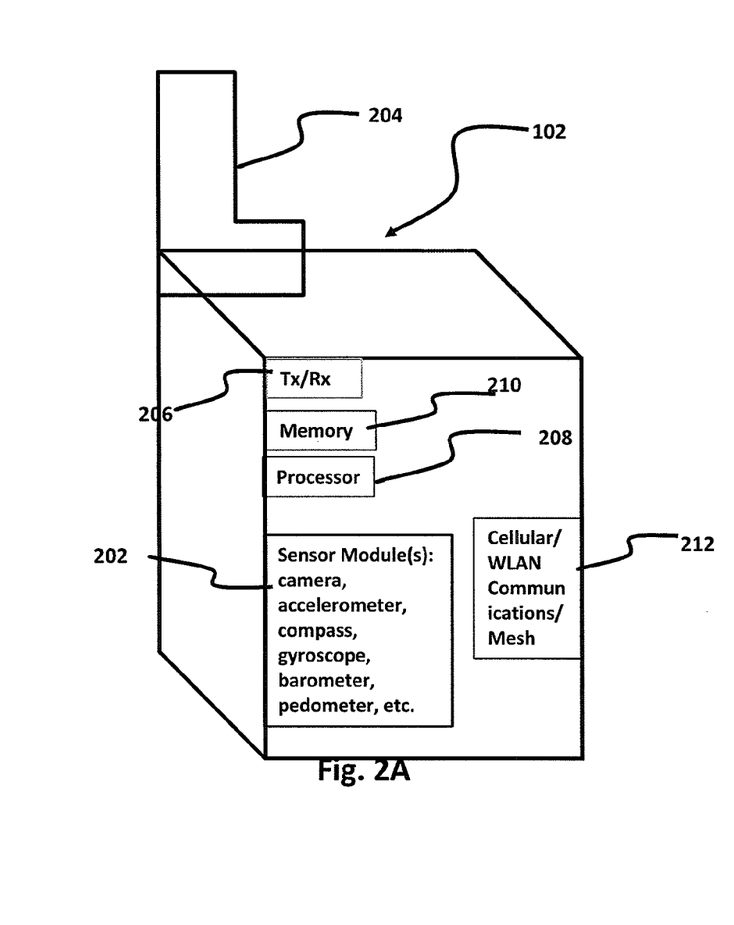
FIG. 2A is a block diagram showing one embodiment of a listening device.

In yet another example, the listening device may be configured to scan at least one existing product displayed in/on the shelf where the transponder is located. The resulting scanned code is then associated with the transponder ID and sent to the server. For example, the listening device 102 may scan a bar code (not shown) of product 114, where the product 114 is placed on the shelf 108a in aisle 112 near the transponder 106a. Alternatively, the listening device may scan the bar code (not shown) of the shelf 108a near the transponder. The listening device 102 may then associate the scanned bar code with the unique ID of the transponder 106a and then send it to the server 104. In one example, the listening device 102 may be coupled with an external bar-code reader (not shown) for scanning purposes. Alternatively, the listening device 102 may use an on-board camera in the sensor module 202, as shown in FIG. 2A, or outside the sensor module 202 (not shown) for scanning purposes. Instead of scanning, the listening device 102, in another example, may capture a digital image of the bar code, using the camera of the sensor module 202, and analyze the digital image of the bar code using an image processing algorithm, stored in the listening device 102. The listening device 102 may also capture digital images of a product for image recognition, or text recognition of a label of the product. In one example, the listening device 102 may compare the captured images with various images of the products in the retail venue, that may be available in the downloaded planogram, stored in the listening device, for product recognition.

Listening device 102 may also scan another barcode (not shown) of the product 116 located near the transponder 106b on the shelf 108b of aisle 112. Again, the associated scanned code and the unique ID of the transponder 106b may be sent to the server 104. The association, in this case, may take place when the listening device 102 is unambiguously sensing the signal of the transponder 106b, for example, in zone Z4.

Server 104, receiving the associated pair of scanned code and the unique ID of the transponder, may further process the associated pair to resolve the scanned code and further determine the association of the transponder with a product. The server may utilize a planogram of the retail venue, stored in the server. As described earlier, a planogram is a layout of the retail venue that provides a diagram or model indicating the placement of retail products on shelves. Thus, the resolved bar code may then be associated to a product or a product type located at a given location in planogram.

The server may then associate the transponder ID with the product (with resolved bar code) and with a product location based on the planogram.

Figure 2B:
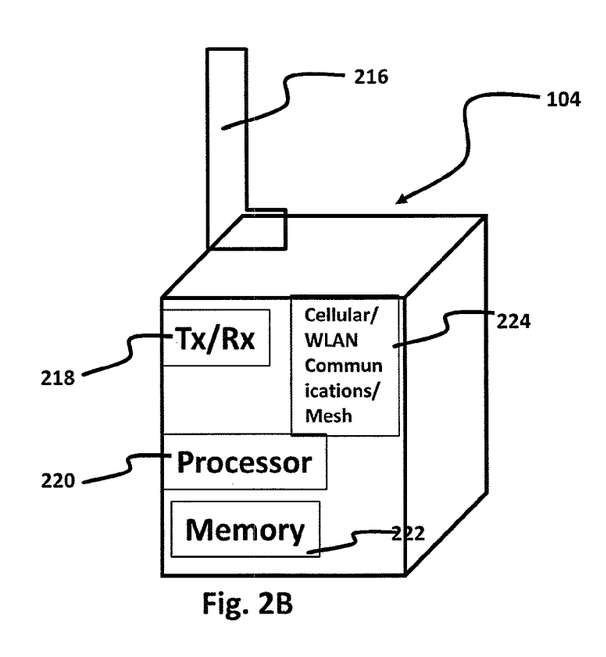
FIG. 2B is a block diagram depicting one embodiment of a server.

In one example, the planogram may be stored in the memory 222 of the server 104, and the processor 220 may be configured to process and resolve the scanned bar code.

Alternatively, the listening device may utilize the on-board camera for taking digital images or videos of the products near a transponder. For example, listening device 102 may take picture of the product 114 and send the picture of the product 114 along with the unique ID of the transponder 106a to the server 104.

Upon receiving the pictures/videos from the listening device 102, the server 104 may process the paired data for product recognition, for example. Alternatively, the server 104 may compare the received images/videos with the images or videos stored in the planogram, for classification of products, in another example. The server 104 may then further perform association of the product with the unique ID of the transponder. For example, based on the planogram, the server may locate the position of the recognized product. As such, the transponder ID may be associated with the recognized product, or with the location of the recognized product. Further, processor 220 of server 104 may be configured to perform the classification and recognition of the product.

Figure 1B:
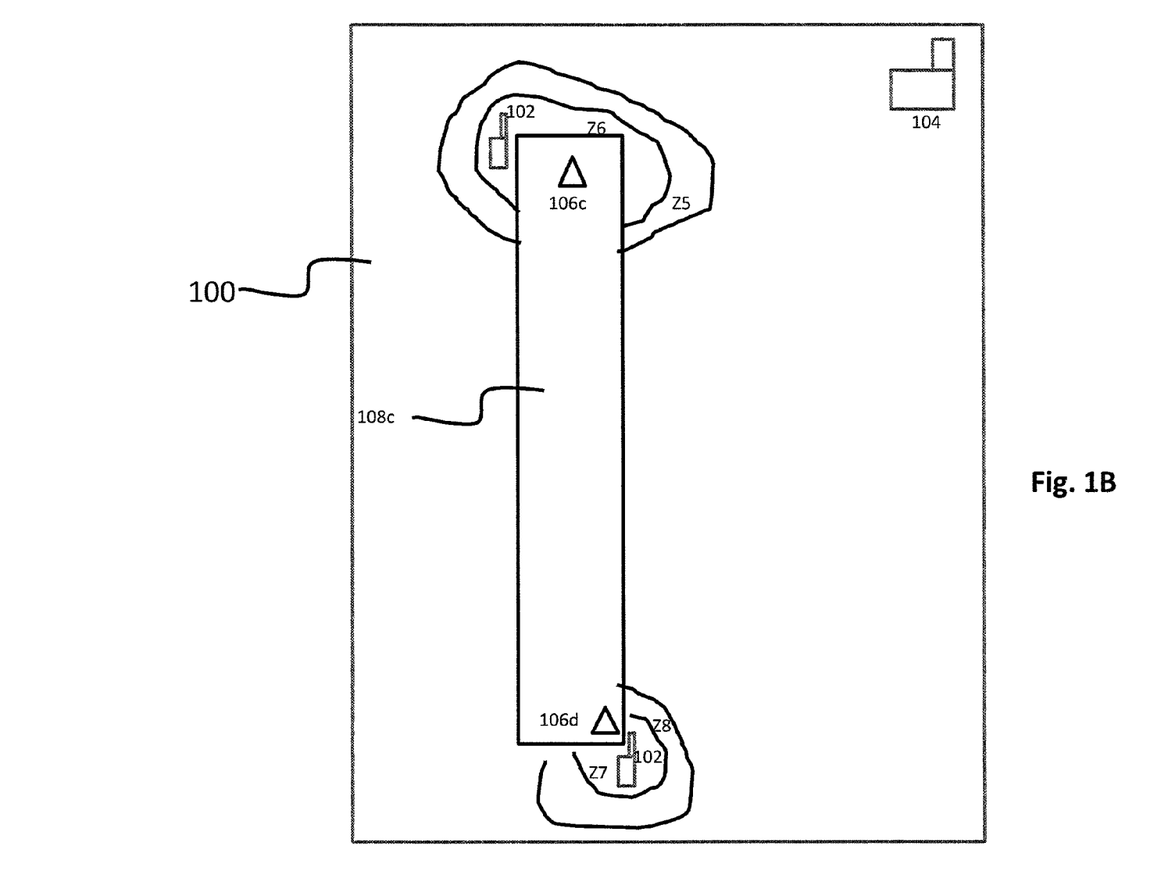
FIG. 1B is a top-view diagram of an embodiment showing the setting up of related transponders in an indoor environment.

In another exemplary embodiment, the listening device may establish a relation between already associated transponders. For example, as shown in FIG. 1B, transponders 106c and 106d are located at the opposite ends of the shelf 108c, however both the transponders may be associated with a similar product type (not shown). In another example, the transponders may be placed adjacent to each other. For example, shelf 108c may store snacks. Although, transponder 106c may be associated with a specific snack product and 106d may be associated with another different snack product (not shown). However, the listening device 102 may measure or listen signals of either of the transponders, and may then send either of the transponder IDs along with a reference point (reference point in a map, picture of the product, or bar code of the product, as described above) of the snack product to the server 104.

Yet, in another exemplary embodiment of the invention, the server 104 may be configured to further associate the transponder to a coordinate system, once the transponder is associated with a physical space (as discussed above) and stored in a database (e.g. memory 222 shown in FIG. 2B) of the server 104. For example, a coordinate map may be stored in the memory 222 and compared to the physical space of the transponder in order to further associate the transponder to a coordinate point.

FIG. 2A is a block diagram of an example listening device 102. The listening device, which may, for example, be a conventional smart phone, includes a receiver and/or transmitter 206, a cellular/WLAN/mesh communications module 212, a memory 210, a sensor module 202, a processor 208 and one or more antennas 204. In one example, the listening device may be a smart phone that includes an application for communicating with tags and assigning the transponder IDs. The receiver 206 senses the low-power signals broadcast by the transponders 106 via one of the antennas 204. The processor 208 may process the signals sensed by the receiver in order to determine the characteristics of the signals and further store these characteristics into the memory 210. For example, the signal characteristics may be further processed by the processor 208 to determine the proximity level of the listening device 102, or the encrypted transponder ID. The transponder ID may be sent to the server 104 via the cellular/WLAN/mesh communications module 212. The module 212, which may include, for example, one or more of an 802.11 Wi-Fi transceiver, a cellular transceiver, a IEEE 802.14 Zigbee® transceiver or a Bluetooth transceiver, may communicate with server 104, for example, to share product information. Communication between listening device and server may be implemented using the communication module 212, for example using a Wi-Fi network, or alternatively, using the short-range communications module 206.

The example listening device 102 further includes an optional sensor module 202 that may include one or more of an accelerometer, a gyroscope, and/or a compass. The sensor module may be used to gather information on movement of the listening device. This information may be processed locally by the processor 208 or it may be sent to the server 104 in addition to signal characteristics for determining proximity level to a transponder. In one example, the sensor module of the listening device may also include a camera (not shown) or bar-code scanner (not shown) that a user may employ to scan barcodes or QR codes of the products on shelves 108 or bar codes or QR codes placed on the shelves.

FIG. 2B is a block diagram of an exemplary embodiment of server 104. The example server includes a processor 220, memory 222, a cellular/WLAN/mesh communication module 224 and antennas 216. The example server 104 is configured to communicate with the listening device using the cellular/WLAN/mesh communication module 224. For example, the server 104 may receive transponder IDs and/or transponder signal characteristics using the cellular/WLAN/mesh communication module 224 and the processor 220 may process the association of the transponder ID with a product, based on a planogram, which may be stored in the memory 222. The cellular/WLAN/mesh communication module 224 may also send the stored data to a requesting listening device 102. As described above, the server may also be configured to communicate with the transponders 106 via the communication module 224, for example, which may use one or more antennas 216 to communicate with the listening devices 102 and/or the transponder devices 106.

Figure 2C:
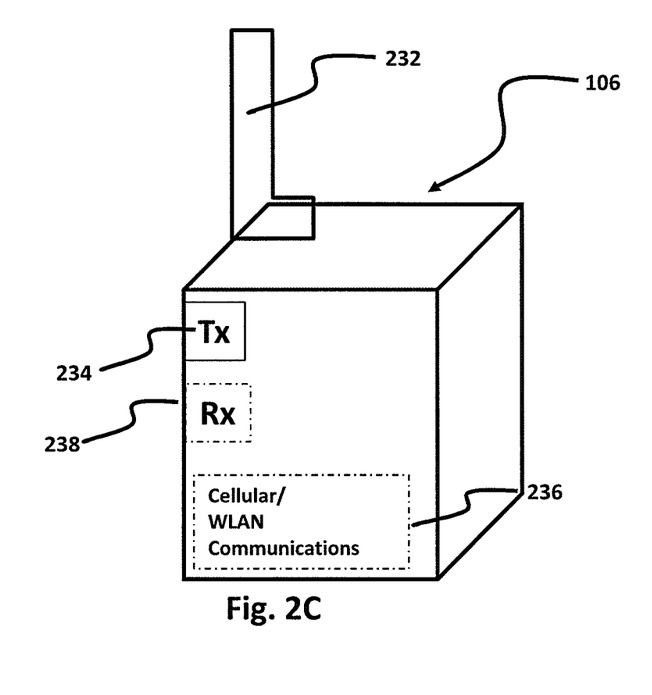
FIG. 2C is a block diagram illustrating one embodiment of a transponder.

FIG. 2C is a block diagram of a transponder device 106 suitable for use with the subject invention. The device includes a transmitter 234, an antenna 232, a receiver 238 and an optional cellular WLAN/mesh communication module 236. The antenna may be used for both the transmitter 234 and WLAN/mesh communications module 236 or separate antennas may be used. In one exemplary embodiment, the transmitter 234 is a Bluetooth low energy (Ble) transmitter. This device periodically sends signals and the listening device may sense the Ble signals, for example, of the transponder 106.

In this example, the transponder 106 includes the transmitter 234 and antenna 232 and does not include the communication module 224. Although not shown, the transponder also includes a power source, for example, a lithium battery. Because it periodically broadcasts a low-power signal, the example transponder 106 may operate for several years using the battery.

In an another example, the transponder 106 may include the antenna 232, and receiver 238 and may be configured to sense low-power signals (e.g. Ble) signals broadcast by the listening devices and to send its identity and information on the detected listening devices to the server, for example, via cellular/WLAN/mesh communications unit 236. Because this device may transmit higher powered signals more often than the transmit-only transponder, it may include a larger battery or may be connected to the store's electrical network.

Figure 3:
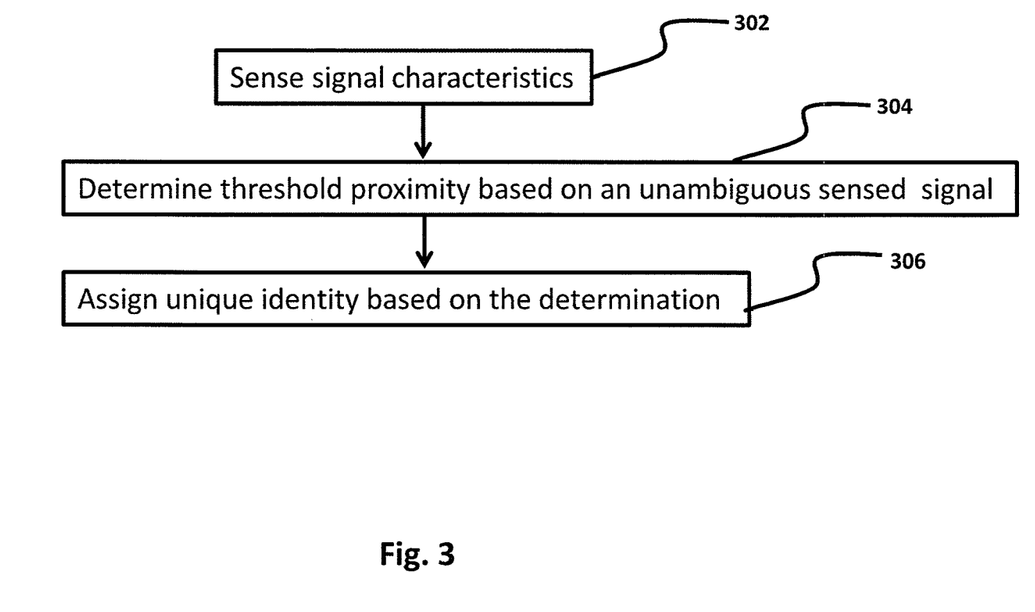
FIG. 3 is a flow-chart of an embodiment describing a method of a listening device assigning identity to a transponder.

In one embodiment, a transponder may be assigned a unique identity. For example, as shown in FIG. 3, at step 302, a listening device senses the transponder signals. In one example, the listening device may be further configured, as described above, to extract signal characteristics from the sensed signal. The listening device 102 determines (step 304) a threshold level of proximity between the listening device and a transponder when the listening device 102 unambiguously senses the signal broadcasted by one of the transponders. When the listening device is within the threshold proximity of the transponder, such that it may communicate securely, or non-securely, with the transponder, the listening device may then assign a unique ID to the transponder (step 306). As described above, assigning of the unique ID may be further based on a store ID, retailer ID, or a tag ID.

Figure 4:
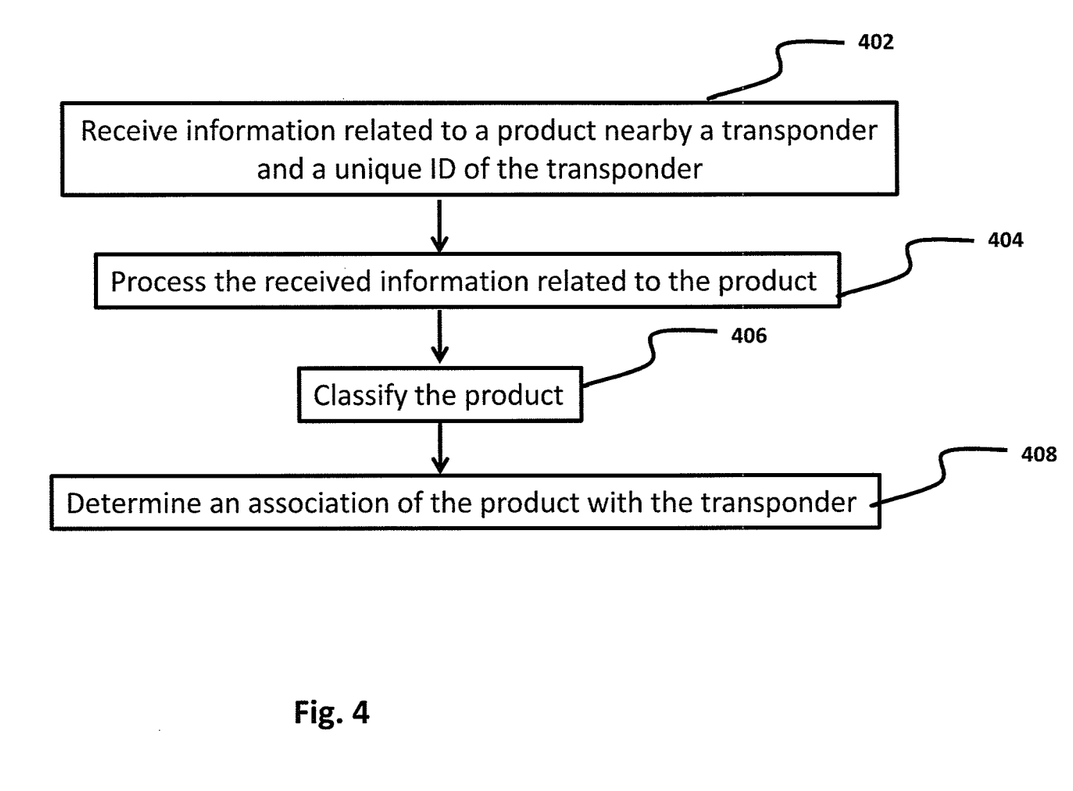
FIG. 4 is a flow-chart of another embodiment depicting a method of a server classifying products.

In another embodiment, the server 104 may be configured to receive an associated pair of a transponder ID and its corresponding reference point, as described in the flow diagram of FIG. 4. At step 402, of this example, the server 104 is configured to receive the transponder ID and information related to a product near the transponder (step 402), as discussed above for FIGS. 1A and 1B. At step 404, the server then processes the received information related to the product. For example, the server may decode a bar code of a product received in step 402. Following this, the server may determine an association of the product with the transponder ID (step 406). The server may use a map, stored in the memory 222, to identify the location of the product (with the decoded bar code), and associate the received transponder ID with the product location (step 406). At step 408, the server may be further configured to perform a classification of the product. For example, the server may determine the kind or type of the product, which may be based on a planogram, stored in the server. The server may also classify the product based on other information, such picture or video of the product, that may be received at step 402. In that case, the server may perform an image recognition process on the digital image/picture or video at step 404 to identify the product.

Figure 5:
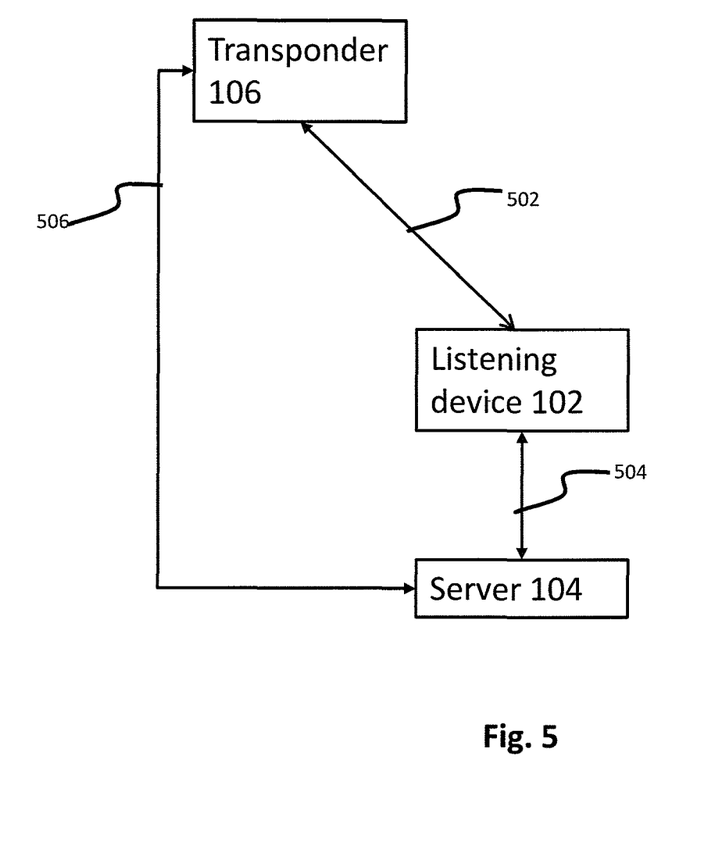
FIG. 5 is a block diagram describing various communication modes of the listening device, transponder and the server.

FIG. 5 is a block diagram which is useful for describing the various communications modes of the listening device 102, transponders 106 and server 104. In FIG. 5, the solid lines indicate communications among the devices for different embodiments.

In one embodiment, the transponders 106 are transmit-only devices that emit signals having signal characteristics and including a transponder ID or label asynchronously and at regular intervals. These signals are sensed by one or more listening devices proximate to one of the transponders (line 502). Listening device 102 senses signals from the transponders that are within range and may collect one or more signal characteristics over a period of time. In addition, the listening device may receive the transponder signal and decode the transponder ID from it. For example, with reference to FIG. 2A, the listening device 102 senses the low-power signals broadcast by the transponders 106 via one of the antennas 204. Information about the sensed signals, such as RSSI, RTT, time of arrival, quality of signal and signal phase are digitized, for example, by an internal ADC (not shown) and stored into the memory 210. In addition, the transponder ID is decrypted from the received signal. In an exemplary embodiment of the invention, the digital values may be analyzed by the processor 208 (i.e. decryption of the tag ID and partial filling in with retailer or store ID) to assign a unique ID to the transponder.

In another embodiment, as shown by the dashed line 502, the transponders 104 may be configured to sense low-power signals (e.g. Ble) signals broadcast by the listening device and to send information of the detected listening devices to the server, for example as shown by line 506. The information sent may include a listening device identifier, characteristics of the sensed signal and a transponder ID. The server may then determine an association of a product to the transponder ID, based on a database, a map, planogram, stored in the server. The server may also process the signal received by the listening device to determine the proximity of the transponder to the listening device. If the listening device is within the threshold proximity level, the server may then send the association of the transponder ID with the product to the listening device (line 506).

Listening device 102 may also be configured to have bi-directional communication (line 502) with the server 104 and further transmit signal characteristics wherein determination of proximity of the listening device with respect to the transponder for a predetermined time may be performed by the server. During the communication, the listening device may also receive the association information of a product with the transponder from the server, for example.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for operating a listening device, the method comprising:
   sensing a plurality of signals from a plurality of transponders, at least one of the transponders having an unknown location;
   determining a level of proximity between the listening device and one of the transponders having an unknown location based on unambiguously sensing the signal from the one transponder;
   assigning a unique identity (ID) to the one transponder based on the determination;
   identifying a location of the one transponder using a map in the listening device;
   optically scanning a plurality of objects separate from and proximate to the one transponder; and
   associating the identified location and the plurality of objects with the one transponder by transmitting, to a remote database, the identified location, information obtained from the optical scans of the plurality of objects, and the assigned unique ID of the one transponder.

2. The method of claim 1, further comprising:
   establishing communication with the one transponder prior to assigning the unique ID to the one transponder when the listening device is within the proximity level with respect to the one transponder.

3. The method of claim 1, wherein unambiguously sensing the signal comprises:
   receiving an identification value of the one transponder; and
   combining the identification value with at least one of: a retailer ID or a store ID, or a combination thereof to generate the unique ID.

4. The method of claim 1, wherein determining the level of proximity comprises:
   determining a respective distance of the listening device from the one transponder.

5. The method of claim 1, wherein associating the identified location and the plurality of objects with the one transponder further comprises:
   identifying a reference point of the one transponder using a reference system, in the listening device, containing a reference to at least one of an aisle number, or a shelf identification, or a product name, or a product description, or a combination thereof; and associating the reference point with the unique ID of the one transponder by transmitting the identified reference point to the remote database with the information obtained from the optical scans of the plurality of objects and the assigned unique ID of the one transponder.

6. The method of claim 1, wherein
   optically scanning the plurality of objects further comprises:
   scanning respective bar codes of the plurality of objects using a bar code reader coupled to the listening device; and
   decoding the scanned bar codes.

7. The method of claim 1, wherein optically scanning the plurality of objects further comprises:
   capturing respective digital images of the plurality of objects, using a camera coupled to the listening device.

8. The method of claim 1, wherein the unambiguously sensed signal is an encrypted signal and the method further comprises:
   decrypting the signal from the one transponder, prior to assigning the unique ID to the one transponder.

9. The method of claim 1, wherein unambiguously sensing the signal further comprises:
   sensing the signal of the one transponder independently of a signal from any other transponder of the plurality of transponders.

10. The method of claim 1, wherein the unambiguously sensing the signal further comprises:
sensing the signal of the one transponder related to a signal of another transponder of the plurality of transponders; and
establishing a connection with the other transponder.

11. The method of claim 6, wherein associating the identified location and the plurality of objects with the one transponder comprises:
transmitting the decoded bar code information with the unique ID of the one transponder to the remote database.

12. The method of claim 7, wherein associating the plurality of objects with the one transponder comprises:
transmitting the captured images of the plurality of objects with the unique ID of the one transponder to the remote database.

13. An apparatus comprising:
a transceiver configured to:
sense a plurality of signals from a plurality of transponders, at least one of the transponders having an unknown location; and
a processor configured to:
determine a level of proximity between the apparatus and one of the transponders having an unknown location based on an unambiguous sensing of the signal from the one transponder;
assign a unique identity (ID) to the one transponder based on the unambiguously sensed signal; and
identify a location of the one transponder using a map in the apparatus;
the transceiver further configured to optically scan a plurality of objects separate from and proximate to the one transponder; and
the processor further configured to associate the identified location and the plurality of objects with the one transponder by transmitting, to a remote database, the identified location, information obtained from the optical scans of the plurality of objects, and the assigned unique ID of the one transponder.

14. The apparatus of claim 13, wherein the processor and the transceiver are further configured to establish communication with the one transponder prior to the assignment of the unique ID to the one transponder when the processor determines that the apparatus is within the proximity level with respect to the one transponder.

15. The apparatus of claim 13, wherein the processor is coupled to a reference system and is further configured to:
identify a reference point of the one transponder using the reference system, the reference system including a reference to at least one of an aisle number, or a shelf identification, or a product name, or a product description, or a combination thereof; and
associate the identified reference point with the unique ID of the one transponder by transmitting the identified reference point to the remote database with the information obtained from the optical scans of the plurality of objects and the unique ID of the one transponder.

16. The apparatus of claim 13, wherein the transceiver comprises a camera, and wherein:
the processor is further configured to:
identify each of the plurality of objects based on respective digital images of the plurality of objects, captured by the camera; and
associate the identified plurality of objects with the unique ID of the transponder by transmitting the respective digital images of the plurality objects to the remote database with the unique ID of the one transponder.

17. A method for operating a server, the method comprising:
receiving, at the server, optical image information from a listening device, the optical image information related to a plurality of objects separate from and proximate to a transponder, and a unique identity of the transponder;
processing, at the server, the received image information related to the plurality of objects to identify the plurality of objects;
classifying, at the server, the plurality of objects into an object group, and
associating, at the server, the object group with the transponder in a database on the server.

18. The method of claim 17, wherein the optical image information includes images of barcodes of the plurality of objects and processing the received image information further comprises decoding barcode information in the images of the plurality of objects.

19. The method of claim 17, wherein the received image information includes images of the plurality of objects and processing the received image information further comprises comparing the received optical image information of the plurality of objects to a plurality of images in a planogram stored in the server to identify a location of the transponder.

20. The method of claim 17, further comprising:
receiving, from the listening device, a coordinate point representing a location of the transponder; and
mapping the location of the transponder to the coordinate point based on a coordinate system stored in the server.

* * * * *